US005703000A

United States Patent [19]

Nakayama et al.

[11] Patent Number: 5,703,000

[45] Date of Patent: Dec. 30, 1997

[54] SEMICONDUCTIVE CERAMIC COMPOSITION AND SEMICONDUCTIVE CERAMIC DEVICE USING THE SAME

[75] Inventors: Akinori Nakayama, Otsu; Terunobi Ishikawa, Toyonaka; Hiroshi Takagi, Otsu; Yukio Sakabe, Kyoto, all of Japan

[73] Assignee: Murata Manufacturing Co., Ltd., Kyoto-fu, Japan

[21] Appl. No.: 796,916

[22] Filed: Feb. 6, 1997

[30] Foreign Application Priority Data

Feb. 6, 1996 [JP] Japan .................................. 8-020165

[51] Int. Cl.[6] ................................................ C04B 35/50

[52] U.S. Cl. .......................... 501/152; 501/132; 252/519

[58] Field of Search .................................. 501/152, 132; 252/519; 315/291; 338/20; 361/94, 100; 331/132

[56] References Cited

U.S. PATENT DOCUMENTS

| | | | |
|---|---|---|---|
| 3,975,658 | 8/1976 | Emtage et al. | 315/71 |
| 3,993,603 | 11/1976 | Nalepa et al. | 252/518 |
| 4,019,097 | 4/1977 | Miller et al. | 361/93 |
| 4,229,775 | 10/1980 | Miller | 361/210 |
| 4,583,146 | 4/1986 | Howell | 361/13 |

OTHER PUBLICATIONS

Japio Patent Abstracts Abstract No. JP407230902A, which is an abstract of Japanese Patent No. 7–230902 (Aug. 1995).

WPIDS Abstract No. 82–14827E, which is an abstract of Japanese Patent No. 57–008439 (Jan. 1982).

WPIDS Abstract No. 93–097016, which is an abstract of Japanese Patent No. 5–039585 (Feb. 1993).

WPIDS Abstract No. 94–352284, which is an abstract of Japanese Patent No. 6–275283 (Sep. 1994).

WPIDS Abstract No. 95–150171, which is an abstract of Japanese Patent No. 7–073886 (Mar. 1995).

*Primary Examiner*—Anthony Green

*Attorney, Agent, or Firm*—Ostrolenk, Faber, Gerb & Soffen, LLP

[57] ABSTRACT

Provided is a semiconductive ceramic composition comprising a lanthanum cobalt oxide and having a negative resistance-temperature characteristic, which contains, as the side component, a chromium oxide in an amount of from about 0.005 to 30 mol % in terms of chromium, and also a semiconductive ceramic device comprising the composition. The device is usable for rush current inhibition, for motor start-up retardation and for halogen lamp protection, and is also usable in temperature-compensated crystal oscillators.

20 Claims, 2 Drawing Sheets

SEMICONDUCTIVE CERAMIC COMPOSITION AND SEMICONDUCTIVE CERAMIC DEVICE USING THE SAME

FIELD OF THE INVENTION

The present invention relates to a semiconductive ceramic composition having a negative resistance-temperature characteristic and also to a semiconductive ceramic device comprising the composition. In particular, it relates to a semiconductive ceramic composition which is used to form devices to be used for rush-current inhibition, those to be used in temperature-compensated crystal oscillators, and others, and also to such semiconductive ceramic devices comprising the composition.

BACKGROUND OF THE INVENTION

Heretofore known are semiconductive ceramic devices having a negative resistance-temperature characteristic (hereinafter referred to as a negative characteristic) which are characterized in that they have a high resistance value at room temperature and that their resistance value is lowered with the elevation of the ambient temperature (such devices are hereinafter referred to as NTC devices).

The NTC devices of that type are used variously, for example, in temperature-compensated crystal oscillators or for rush-current inhibition, motor start-up retardation or halogen lamp protection.

For example, temperature-compensated crystal oscillators (hereinafter referred to as TCXO) comprising NTC devices are used as frequency sources in electronic instruments such as those for communication systems. TCXO is grouped into a direct TCXO which comprises a temperature-compensating circuit and a crystal oscillator and in which the temperature-compensating circuit is directly connected with the crystal oscillator inside the oscillation loop, and an indirect TCXO in which the temperature-compensating circuit is indirectly connected with the crystal oscillator outside the oscillation loop. The direct TCXO comprises at least two NTC devices and the oscillation frequency from the crystal oscillator is subjected to temperature compensation. In this, one NTC device has a low resistance value of about 30Ω or so at room temperature (25° C.) for attaining the intended temperature compensation at room temperature or lower, while the other has a high resistance value of about 3000Ω or so at room temperature (25° C.) for attaining the intended temperature compensation at temperatures higher than room temperature.

NTC devices for rush-current inhibition are those for absorbing initial rush currents in electronic instruments. At the switching instant, overcurrents are applied to electronic instruments from a switching power source. NTC devices for rush-current inhibition act to prevent the overcurrent from breaking the other semiconductive devices such as IC and diodes and also halogen lamps, or from shortening the life of such devices and halogen lamps. After having been switched on, the NTC device of this type absorbs the initial rush current to thereby prevent any overcurrent from running through the circuit in an electronic instrument, and thereafter this is self-heated and thus has a lowered resistance value at the higher temperature. In the self-heated, steady state condition, the NTC device then acts to reduce the power consumption.

NTC devices for motor start-up retardation are those for retarding the starting-up time for motors started up, for a predetermined period of time. In gear motors which are so constructed that a lubricant oil is fed to the gearbox after the start of the motor, the gear is often damaged due to the insufficient supply of a lubricant oil to the gear if the gear is directly rotated at a high speed immediately after the application of an electric current to the motor. In order to prevent the gear from being damaged in this case, the starting-up motion of the driving motor is retarded for a predetermined period of time by the use of an NTC device. On the other hand, in motors for driving lapping machines in which a grinder is rotated to polish the surface of a ceramic part, the ceramic part is often cracked if the lapping disc is rotated at a high speed just after the start of the driving motor. In order to prevent the ceramic part from being cracked in this case, the starting-up motion of the driving motor is retarded for a predetermined period of time by the use of an NTC device. For these, the NTC device acts to lower the voltage applied to the terminals of the motor being started up, and thereafter it is self-heated and thus has a lowered resistance value at the elevated temperature. At steady state, the motor is rotated at a desired speed.

The conventional semiconductive ceramics with such a negative resistance-temperature characteristic that have heretofore been used for constructing the NTC devices such as those mentioned above comprise spinel oxides of transition metal elements such as manganese, cobalt, nickel, copper, etc.

To attain accurate temperature compensation for the oscillation frequency in TCXO, it is desirable that the NTC device therein has a large degree of resistance-temperature dependence (hereinafter referred to as "constant B"). In general, the spinel oxides of transition metal elements have a positive relationship between the specific resistance at room temperature and constant B. Therefore, those having a small specific resistance at room temperature have a small constant B.

On the other hand, the spinel oxides of transition metal elements having a large specific resistance at room temperature have a large constant B. Therefore, laminate structures of NTC devices may have a lowered resistance value even though each constitutive NTC device has a high specific resistance. In that manner, therefore, it may be possible to obtain laminated NTC devices having a large constant B. However, the laminated NTC devices are problematic in that their capacitance is enlarged, resulting in the accuracy in the temperature-compensating circuit comprising the NTC laminate being lowered.

Where NTC devices are used for rush current inhibition, they must be self-heated to achieve the lowered resistance value at elevated temperatures. However, the conventional NTC devices comprising spinel oxides tend to have a smaller constant B if their specific resistance is lowered. Therefore, the conventional NTC devices are problematic in that they could not have a sufficiently lowered resistance value at elevated temperatures and therefore their power consumption at the steady state could not be reduced.

For example, to satisfactorily reduce the resistance value of tabular NTC devices at high temperatures, their surface area may be enlarged or their thickness may be reduced. However, the increase in the surface area of NTC devices is contradictory to the reduction in their size; and the reduction in the thickness of NTC devices may not be acceptable in view of their strength.

In order to overcome these problems, there has been proposed a monolithic NTC device comprising a plurality of ceramic layers and a plurality of inner electrodes each sandwiched between the adjacent ceramic layers, in which are formed a pair of outer electrodes at the sides of the laminate of such ceramic layers and inner electrodes. In this, the pair of outer electrodes are electrically and alternately connected with the inner electrodes. However, the space between the facing inner electrodes is narrow. Therefore, the monolithic NTC device is still problematic in that if an overcurrent (of several amps or higher) is run therethrough at the start of switch-on, it is often broken.

Another NTC device has been proposed which comprises $BaTiO_3$ and 20% by weight of $Li_2CO_3$ added thereto, and which may have a rapidly enlarged constant B at the phase transition point (see Japanese Patent Publication No. 48-6352). However, since this NTC device has a large specific resistance of $10^5$ Ωcm or more at 140° C., it is problematic in that its power consumption at the steady state is large.

An NTC device comprising $VO_2$ exhibiting a rapidly-varying resistance characteristic is characterized in that its specific resistance is lowered from 10 Ωcm to 0.01 Ωcm at 80° C. Therefore, this may be advantageously used for rush-current inhibition or for motor start-up retardation. However, this $VO_2$-containing NTC device is unstable. In addition, since this must be produced by reductive baking followed by rapid cooling, its shape is limited to only beads. Moreover, since the acceptable current value for this is small, up to several tens mA, the NTC device of this type cannot be used in switching power sources or driving motors where a large current of several amps is used.

V. G. Bhide and D. S. Rajoria say that rare earth-transition element oxides exhibit a negative resistance-temperature characteristic, having a low resistance value at elevated temperatures while having a small constant B at room temperature and having a large constant B at high temperatures (see Phys. Rev. B6, [3], 1021, 1972).

For example, the electric characteristics of devices comprising $LaCrO_3$ are disclosed by N. Umeda and T. Awa (see Electronic Ceramics, Vol. 7, No. 1, 1976, p. 34, FIGS. 4 and 5). In this literature, the devices are known to exhibit a negative resistance-temperature characteristic. To use for rush-current inhibition, these $LaCrO_3$-containing NTC devices may be good, having a specific resistance of about 10 Ωcm or so at room temperature. However, having a constant B of smaller than 2000K, these $LaCrO_3$-containing NTC devices are still problematic in that if their resistance value is controlled in order to use them for rush-current inhibition, their power consumption at the steady state is too large with the result that they are heated too highly and are broken.

Tolochko, et al. say that the substitution of a part of Co in $LaCoO_3$ with Cr is effective for gradually increasing the specific resistance of the thus-substituted $LaCo/CrO_3$ (Izv. Akad. Nauk. SSSR, Neorg. Mater., Vol. 23, No. 5, 1987, page 832, FIG. 3 and lines 38 to 43). In this report, however, they measured the specific resistance of the materials only at 20° C., and they did not clarify the characteristics of the materials comprising Cr of less than 5 mol %.

Given the situation, we, the present inventors have assiduously made various experiments for producing various semiconductive ceramic compositions and for using them under practical conditions, while specifically noting oxides of rare earth elements and Co-type elements, especially $LaCoO_3$. The characteristics of $LaCoO_3$-containing NTC devices are disclosed by A. H. Wlacov and O. O. Shikerowa in Ka , 32, [9], 1990, page 2588, FIG. 2, and page 2587, lines 36 to 42. Thus, it is known that $LaCoO_3$ has a lower resistance value than $GdCoO_3$.

However, as compared with the conventional spinel-structured transition metal oxides, such oxides of rare earth elements and Co-type elements have a small constant B, though having a low resistance value at high temperatures, and therefore they have not been put to practical use in the art.

SUMMARY OF THE INVENTION

One object of the present invention is to provide a semiconductive ceramic composition characterized by a low specific resistance at room temperature and by a large constant B at high temperatures, and also to provide a semiconductive ceramic device which comprises the composition and which can be used for rush-current inhibition, for motor start-up retardation, for halogen lamp protection and even in instruments through which large currents are run.

Another object of the present invention is to provide a semiconductive ceramic composition having a low specific resistance and a large constant B at room temperature while still having a large constant B even at temperatures lower than room temperature, and also to provide a semiconductive ceramic device usable in temperature-compensated crystal oscillators.

Specifically, the first aspect of the present invention is a semiconductive ceramic composition comprising a lanthanum cobalt oxide having a negative resistance-temperature characteristic, which contains, as a side component, chromium oxide in an amount of from about 0.005 to 30 mol % in terms of chromium.

The second aspect of the invention is a semiconductive ceramic composition comprising a lanthanum cobalt oxide having a negative resistance-temperature characteristic, which contains, as a side component, chromium oxide in an amount of from about 0.1 to 10 mol % in terms of chromium.

The third aspect of the invention is a semiconductive ceramic composition, which comprises, as the essential component, a semiconductive ceramic component of a lanthanum cobalt oxide having a negative resistance-temperature characteristic, and containing, as a side component, chromium oxide in an amount of from about 0.1 to 30 mol % in terms of chromium for use in a temperature compensating device.

The fourth aspect of the invention is a semiconductive ceramic composition, which comprises, as the essential component, a semiconductive ceramic component of a lanthanum cobalt oxide having a negative resistance-temperature characteristic, and contains, as a side component, chromium oxide in an amount of from about 0.5 to 10 mol % in terms of chromium.

The fifth aspect of the invention is a semiconductive ceramic composition, which is used to form a device for rush-current inhibition, a device for motor start-up retardation, or a device for halogen lamp protection.

The sixth aspect of the invention is a semiconductive ceramic composition, which is used to form a device in temperature-compensated crystal oscillators.

The seventh aspect of the invention is a semiconductive ceramic device comprising a semiconductive ceramic part having a negative resistance-temperature characteristic and an electrode as formed on the surface of said semiconductive ceramic part, which is characterized in that said semiconductive ceramic part having a negative resistance-temperature characteristic comprises a lanthanum cobalt oxide and contains, as a side component, chromium oxide in an amount of from about 0.005 to 30 mol % in terms of chromium.

The eighth aspect of the invention is a semiconductive ceramic device comprising a semiconductive ceramic part, in which said semiconductive ceramic part comprises lanthanum cobalt oxide and contains, as the side component, chromium oxide in an amount of from about 0.1 to 10 mol % in terms of chromium.

The ninth aspect of the invention is a semiconductive ceramic device comprising a semiconductive ceramic part, in which said semiconductive ceramic part comprises a lanthanum cobalt oxide and contains, as a side component, chromium oxide in an amount of from about 0.1 to 30 mol % in terms of chromium.

The tenth aspect of the invention is a semiconductive ceramic device comprising a semiconductive ceramic part, in which said semiconductive ceramic part comprises a lanthanum cobalt oxide and contains, as the side component, chromium oxide in an amount of from about 0.5 to 10 mol % in terms of chromium.

The eleventh aspect of the invention is a semiconductive ceramic device, which is used for rush-current inhibition, for motor start-up retardation, or for halogen lamp protection.

The twelfth aspect of the invention is a semiconductive ceramic device, which is used in temperature-compensated crystal oscillators.

DETAILED DESCRIPTION OF THE INVENTION

Figure 1:
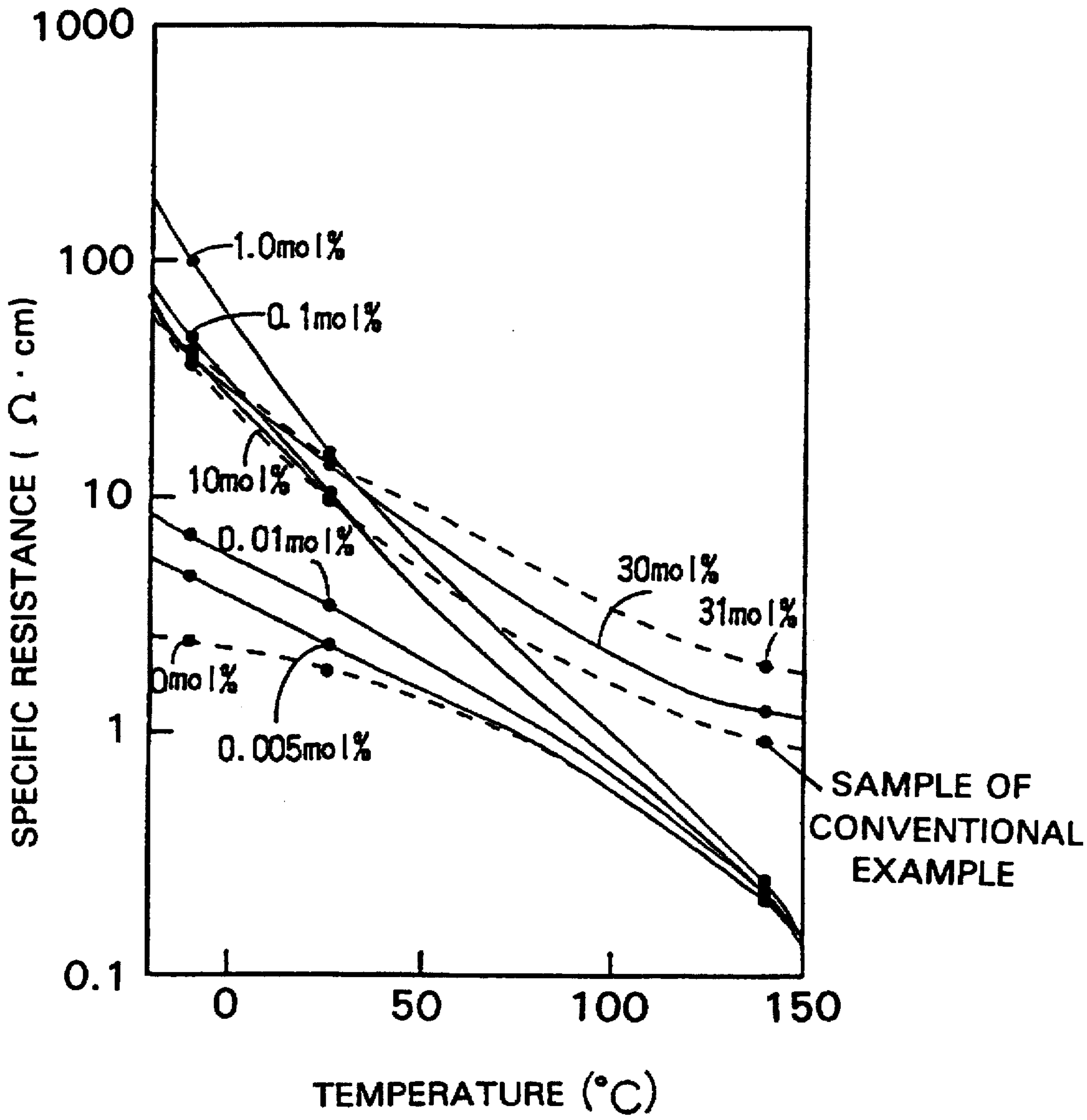
FIG. 1 shows the resistance-temperature characteristic of the samples of Example 1 and the sample of Conventional Example 1.

The chromium content of the semiconductive ceramic composition of the present invention is defined to fall between about 0.005 mol % and 30 mol % in terms of chromium. This is because if the chromium content is smaller than about 0.005 mol %, the chromium oxide added is not satisfactorily effective, resulting in the failure in enlarging the constant B of a device made of the composition. If, however, it is larger than about 30 mol %, not only the constant B of a device made of the composition is smaller than that of the devices made of chromium-free compositions or conventional compositions having a negative resistance-temperature characteristic but also the specific resistance of the former is merely the same as that of the latter.

In particular, the chromium content is preferably within the range between about 0.1 mol % and about 10 mol %, since the device comprising the composition that has a chromium content falling within that range may have a constant B of 4000K or higher at high temperatures and therefore the device is the most suitable for the inhibition of initial rush currents.

The chromium content of the semiconductive ceramic composition for temperature compensating devices of the present invention is also defined to fall between about 0.1 mol % and 30 mol % in terms of chromium. This is because if the chromium content is smaller than about 0.1 mol %, the chromium oxide added is not satisfactorily effective, resulting in the failure in enlarging the constant B of the device made of the composition. If, however, it is larger than about 30 mol %, the specific resistance of a device made of the composition is too large.

In particular, the chromium content is preferably within the range between about 0.5 mol % and about 10 mol %, since the variation in the specific resistance and the constant B at room temperature of a device may depend on its chromium content and can be small thereby resulting in the success in stable production of temperature-compensating devices having the most desirable resistance-temperature characteristic with which the oscillation frequency from crystal oscillators can be well compensated relative to the ambient temperature.

In the composition of the present invention, the molar ratio of lanthanum to the sum of cobalt and chromium is preferably from about 0.50/1 to 0.999/1, and most preferably about 0.90 to 0.99/1. This is because if the molar ratio is larger than about 0.999/1, the non-reacted lanthanum oxide ($La_2O_3$) in the sintered ceramic of the composition reacts with the water in the ambient air to cause the ceramic to break and become unusable as the intended device. If, however, the molar ratio is smaller than about 0.50/1, a device made of the composition has a small constant B although having an enlarged specific resistance.

Now, the present invention is described in more detail with reference to the following examples, which, however, are not intended to restrict the scope of the invention.

EXAMPLE 1

A cobalt compound ($CoCO_3$, $Co_3O_4$ or CoO) and a lanthanum compound ($La_2O_3$ or $La(OH)_3$) were weighed and ground. Added thereto was a chromium compound ($Cr_2O_3$ or $CrO_3$) in such a manner that the molar ratio of lanthanum to the sum of cobalt and chromium in the resulting mixture was 0.95/1. The mixture was wet-milled in a ball mill for 24 hours together with pure water and zirconia balls, then dried, and thereafter calcined at from 900° to 1200° C. for 2 hours. A binder was added to the thus-calcined powder, which was further wet-milled in a ball mill for 24 hours together with zirconia balls. Then, this was filtered, dried and shaped under pressure into discs, which were baked at from 1200° to 1600° C. in air for 2 hours to obtain sintered discs. Both surfaces of these discs were coated with a silver-palladium alloy paste, and baked at from 900° to 1400° C. in air for 5 hours, thereby forming outer electrodes on these discs. Thus were formed herein semiconductive ceramic device samples.

The specific resistance and the constant B of each sample formed herein were measured, and the data thus measured are shown in Table 1. In Table 1, the samples with the mark "*" are outside the scope of the present invention, and the other samples are within the scope of the invention.

The specific resistance (ρ) is obtained from the following equation:

$$\rho(T)=R(T)\times S/t$$

where R(T) is the resistance value at T° C., S is the surface area of the outer electrode, and t is the thickness of the semiconductive ceramic device sample.

The specific resistance of each sample as prepared in Example 1, that is obtained from the resistance value thereof at −10° C., 25° C. and 140° C., may be represented by the following equations:

$$\rho(-10)=R(-10)\times S/t$$

$$\rho(25)=R(25)\times S/t$$

$\rho(140)=R(140)\times S/t$

The constant B is a constant that indicates the variation in the resistance depending on the variation in temperature. This may be defined as follows:

$$\text{Constant } B(T1, T2)=\{\log \rho(T2)-\log \rho(T1)\}/(1/T2-1/T1)$$

where ρ(T1) and ρ(T2) are the specific resistance at T1° C. and T2° C., respectively. The larger the constant B, the smaller the reduction in the resistance value with the elevation of temperature.

On the basis of the above, the constant B of each sample as prepared in Example 1 obtained from the specific resistance thereof at −10° C., 25° C. and 140° C. is as follows:

$$B(-10, 25)=\{\log \rho(-10)-\log \rho(25)\}/\{1/(-10+273.15)-1/(25+273.15)\}$$

$$B(25, 140)=\{\log \rho(140)-\log \rho(25)\}/\{1/(140+273.15)-1/(25+273.15)\}$$

B (−10, 25) is the constant B within the temperature range between −10° C. and +25° C.; and B (25, 140 is the constant B within the temperature range between 25° C. and 140° C.

TABLE 1

| Sample No. | Chromium Content (mol %) | ρ (Ω · cm) 25 A | 140 B | −10 | A/B | Constant B (K) −10, 25 C | 25, 140 D | D/C |
|---|---|---|---|---|---|---|---|---|
| 1* | 0 | 1.9 | 0.20 | 2.5 | 9.5 | 800 | 2410 | 3.0 |
| 2 | 0.005 | 2.5 | 0.22 | 4.7 | 11.4 | 1420 | 2600 | 1.8 |
| 3 | 0.01 | 3.6 | 0.18 | 7.1 | 20.0 | 1510 | 3190 | 2.1 |
| 4 | 0.02 | 5.0 | 0.19 | 12.6 | 26.3 | 2050 | 3500 | 1.7 |
| 5 | 0.05 | 6.7 | 0.19 | 20.6 | 35.3 | 2530 | 3800 | 1.5 |
| 6 | 0.1 | 9.5 | 0.21 | 37.4 | 45.2 | 3080 | 4100 | 1.3 |
| 7 | 0.2 | 12.6 | 0.19 | 60.5 | 66.3 | 3510 | 4400 | 1.3 |
| 8 | 0.5 | 18.5 | 0.23 | 108.1 | 80.4 | 3960 | 4650 | 1.2 |
| 9 | 1 | 16.1 | 0.23 | 101.1 | 70.0 | 4120 | 4530 | 1.1 |
| 10 | 2 | 14.8 | 0.22 | 85.1 | 67.3 | 3730 | 4490 | 1.2 |
| 11 | 5 | 12.9 | 0.22 | 65.7 | 58.6 | 3640 | 4240 | 1.2 |
| 12 | 10 | 10.9 | 0.21 | 51.2 | 51.9 | 3470 | 4020 | 1.2 |
| 13 | 20 | 12.4 | 0.56 | 39.3 | 22.1 | 2580 | 3320 | 1.3 |
| 14 | 30 | 14.0 | 1.29 | 42.9 | 10.9 | 2510 | 2550 | 1.0 |
| 15* | 31 | 15.0 | 2.01 | 45.5 | 7.5 | 2490 | 2150 | 0.9 |
| Conventional Sample 1 | 0 | 10.0 | 0.97 | 38.0 | 10.3 | 3000 | 2500 | 0.8 |

As seen in Table 1 above, both the specific resistance and the constant B of the samples increase with the increase in the chromium content thereof. However, when the chromium content is higher than about 0.5 mol %, the specific resistance and the constant B lower; when the chromium content is higher than 20 mol %, the specific resistance increases while the constant B lowers; and when the chromium content is 31 mol %, the constant B (25, 140) is smaller than the constant B (−10, 25).

When the chromium content falls between about 0.005 mol % and 30 mol %, the constant B (25, 140) is higher than 2500K. In particular, when the chromium content falls between 0.1 mol % and 10.0 mol %, both the constant B (−10, 25) and the constant B (25, 140) are high, the former being higher than 3000K and the latter being higher than 4000K.

FIG. 1 is a graph showing the dependence on temperature of the specific resistance of semiconductive ceramic device samples, in which the vertical axis indicates the specific resistance (Ωcm) and the horizontal axis indicates the temperature (°C.) and in which each curve indicates a different in the chromium content in each sample. The full lines indicate the samples falling within the scope of the present invention, while the dotted lines indicate those falling outside the invention.

As seen in FIG. 1, the semiconductive ceramic device samples of the present invention have a small specific resistance at 25° C. of not higher than 20 Ωcm, and still have a small specific resistance even at high temperatures of not higher than 10 Ωcm.

When a current of 20 A was applied to the semiconductive ceramic device samples as prepared herein, those falling within the scope of the present invention were not broken.

Since the samples of the present invention have a large constant B (25, 140), they inhibit the initial overcurrent while consuming a reduced power amount at steady state. Thus, these are excellent as devices for rush current inhibition, for motor start-up retardation and for halogen lamp protection.

Conventional Example 1

$Mn_3O_4$, NiO and $Co_3O_4$ were weighed in a ratio by weight of 6:3:1, and wet-milled in a ball mill for 5 hours along with pure water, a binder and zirconia balls. Then, the thus-milled mixture was filtered and dried. Next, in the same manner as in Example 1, the resulting dry powder was shaped under compression into discs, which were baked at 1200° C. in air for 2 hours to obtain sintered discs. Both surfaces of these discs were coated with a silver-palladium alloy paste and baked at from 900° to 1100° C. for 5 hours in air, to thereby form outer electrodes on the discs. Thus were prepared herein semiconductive ceramic device samples.

The electric characteristics of the sample prepared herein were determined in the same manner as in Example 1. Of these, the specific resistance (ρ) and the constant B at the predetermined temperatures are shown in Table 1. The resistance-temperature characteristic is shown in FIG. 1.

As shown in Table 1, the constant B (25, 140) of the semiconductive ceramic device sample of Conventional Example 1 is smaller than the constant B (−10, 25) thereof. Thus, it is known that the energy consumption of this conventional sample is large at steady state.

Comparing the sample of Conventional Example 1 with the samples of Example 1 of the present invention having the same degree of specific resistance, it is revealed that the samples of Example 1 of the invention have a higher constant B (25, 140). In general, a reduction in the specific resistance results in the reduction in the constant B. As opposed to this, however, it is known that the semiconductive ceramic composition of the present invention that is characterized by comprising $LaCoO_3$ and from about 0.005 to 30 mol % of chromium added thereto has a higher constant B than the sample of Conventional Example 1.

EXAMPLE 2

A powdery lanthanum compound ($La_2O_3$ or $La(OH)_3$) and a powdery cobalt compound ($CoCO_3$, $Co_3O_4$ or CoO) were weighed in a molar ratio of lanthanum to cobalt of 0.95/1, to which was added from 0.01 to 40 mol % of a chromium compound ($Cr_2O_3$ or $CrO_3$). The mixture was wet-milled in a ball mill for 16 hours together with pure water and nylon balls, then dried, and thereafter calcined at from 900° to 1200° C. for 2 hours. The resulting mixture was further ground in a jet mill, to which was added 5% by weight of a vinyl acetate binder along with pure water. This was again wet-milled, then dried and granulated. The resulting granules were shaped under pressure into discs, which were baked at from 1200° to 1600° C. in air for 2 hours to obtain sintered discs. Both surfaces of these discs were screen-printed with a silver-palladium alloy paste, and baked at from 900° to 1200° C. in air for 5 hours, thereby forming outer electrodes on these discs. Thus were formed herein semiconductive ceramic device samples.

The specific resistance and the constant B of each sample formed herein were measured in the same manner as in Example 1, and the data thus measured are shown in Table 2. In Table 2, the samples with the mark "*" did not have the intended characteristics applicable to the use of the samples as semiconductive ceramic devices for TCXO. The specific resistance was derived from the resistance value at 25° C. according to the equation employed in Example 1.

To obtain the constant B, used herein were the same equations as those in Example 1. Thus, of the samples of Example 2, the constant B was derived from the specific resistance thereof at −30° C., 25° C., 50° C. and 140° C. to be as follows:

$$B(-30, 25)=\{\log \rho(-30)-\log \rho(25)\}/\{1/(-30+273.15)-1/(25+273.15)\}$$

$$B(25, 50)=\{\log \rho(50)-\log \rho(25)\}/\{1/(50+273.15)-1/(25+273.15)\}$$

$$B(25, 140)=\{\log \rho(140)-\log \rho(25)\}/\{1/(140+273.15)-1/(25+273.15)\}$$

B(−30, 25) is the constant B within the temperature range between −30° C. and +25° C.; B (25, 50) is the constant B within the temperature range between 25° C. and 50° C.; and B (25, 140) is the constant B within the temperature range between 25° C. and 140° C.

TABLE 2

| Sample No. | Chromium Content (mol %) | Specific Resistance, ρ (25), Ω · cm | Constant B (K) −30, 25 | 25, 50 | 25, 140 |
|---|---|---|---|---|---|
| 1* | 0.01 | 2.0 | 1160 | 2200 | 3150 |
| 2* | 0.05 | 3.9 | 1380 | 2510 | 3200 |
| 3 | 0.1 | 9.1 | 3010 | 3040 | 3390 |
| 4 | 0.5 | 14.6 | 3310 | 3700 | 4010 |
| 5 | 1.0 | 18.7 | 3760 | 4080 | 4430 |
| 6 | 1.5 | 18.6 | 3930 | 4170 | 4560 |
| 7 | 2.0 | 17.7 | 3990 | 4140 | 4620 |
| 8 | 2.5 | 17.2 | 4040 | 4200 | 4620 |
| 9 | 3.0 | 16.8 | 4040 | 4190 | 4610 |
| 10 | 3.5 | 16.4 | 4030 | 4180 | 4610 |
| 11 | 4.0 | 15.9 | 4040 | 4130 | 4600 |
| 12 | 4.5 | 15.9 | 4020 | 4160 | 4590 |
| 13 | 5.0 | 16.2 | 3980 | 4130 | 4590 |
| 14 | 6.0 | 16.1 | 4010 | 4130 | 4570 |
| 15 | 7.0 | 17.5 | 3940 | 4110 | 4550 |
| 16 | 8.0 | 19.3 | 3890 | 4070 | 4520 |
| 17 | 9.0 | 21.0 | 3840 | 4060 | 4500 |
| 18 | 10.0 | 23.5 | 3810 | 4030 | 4470 |
| 19 | 15.0 | 31.4 | 3670 | 3900 | 4380 |
| 20 | 20.0 | 37.6 | 3480 | 3760 | 4190 |
| 21 | 25.0 | 42.8 | 3340 | 3650 | 4100 |
| 22 | 30.0 | 48.9 | 3200 | 3510 | 4010 |
| 23* | 35.0 | 55.1 | 3020 | 3250 | 3620 |
| 24* | 40.0 | 59.3 | 2890 | 3010 | 3230 |
| Conventional Sample 2 | 0.0 | 16.2 | 2760 | 2750 | 2750 |

As shown in Table 2 above, the specific resistance of the samples increases and the constant B thereof increases to be higher than 3000K with the increase in the chromium content of the samples. However, when the chromium content is not higher than about 0.05 mol %, the constant B is lower than 3000K, and when the chromium content is higher than about 30 mol %, the specific resistance is above 50 Ωcm, and both are not suitable for temperature compensation. As opposed to these, the samples falling within the scope of the present invention have low specific resistance. Using these, therefore, the surface area of the electrode of the devices having a predetermined resistance value may be reduced and the capacitance of the devices may be small. Accordingly, the accuracy of the devices of the present invention, when used in temperature-compensating circuits for temperature compensation in TCXO, is high.

With the increase in the constant B (−30, 25), the variation in the resistance value, relative to temperature, increases, resulting in that the devices in temperature-compensating circuits in TCXO can compensate low temperatures falling within a broad range. It is known from Table 2 that the constant B (25, 50) and the constant B (25, 140) of the samples of the present invention are both higher than the constant B (−30, 25) thereof.

Of the samples of the present invention having a chromium content falling between about 0.1 mol % and 30mol %, all the constant B (−30, 25), the constant B (25, 50) and the constant B (25, 140) are higher than 3000K. In particular, of those having a chromium content falling between about 0.5 mol % and 10.0 mol %, the variation in the resistance-temperature characteristic, relative to the chromium content, is stably small. Thus, the samples of the present invention having a chromium content of from about 0.5 mol % to 10.0 mol % are the most suitable as NTC devices in temperature-compensating circuits in TCXO.

Figure 2:
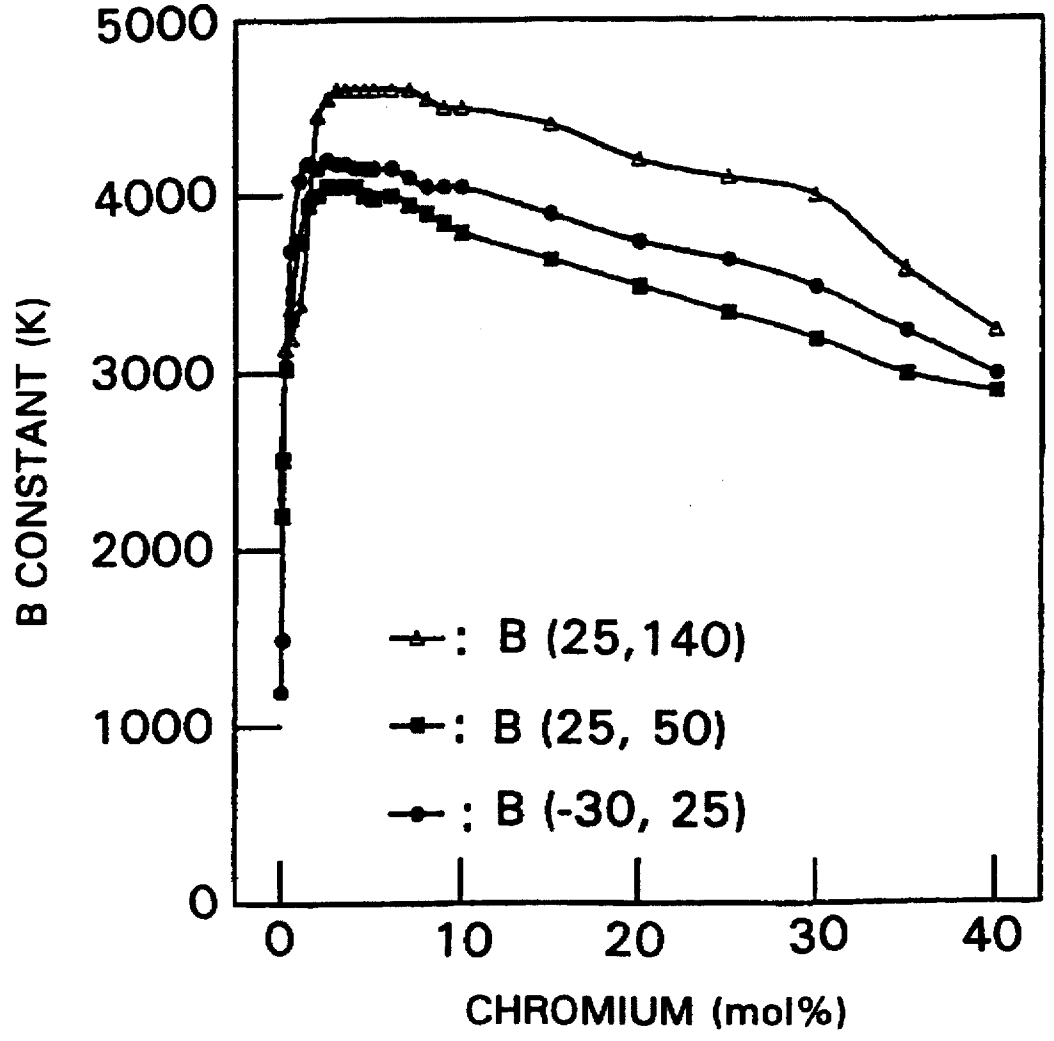
FIG. 2 shows the relationship between the chromium content of the samples of Example 2 and the constant B thereof.

FIG. 2 shows the relationship between the chromium content of the semiconductive ceramic device samples prepared in Example 2 and the constant B thereof, in which the vertical axis indicates the constant B (K) and the horizontal axis indicates the chromium content (mol %). In FIG. 2, ● (filled circle) indicates the constant B (−30, 25); ■ (filled rectangle) indicates the constant B (25, 50), and Δ indicates the constant B (25, 140). As in FIG. 2, the samples having a chromium content of 0.1 mol % or higher all have a constant B of higher than 3000K.

Conventional Example 2

A semiconductive ceramic device sample was prepared herein in the same manner as in Example 2, except that $Mn_3O_4$, NiO and $Co_3O_4$ weighed in a ratio by weight of 6:3:1 were used herein.

The characteristics of the sample prepared herein were determined in the same manner as in Example 2. The data are shown in Table 2.

As seen in Table 2, the constant B (25, 50) at high temperatures of the semiconductive ceramic device sample of Conventional Example 2 is smaller than the constant B (−30, 25) thereof at low temperatures. In addition, both constants B are smaller than 3000K.

In the composition of the present invention, the molar ratio of lanthanum to the sum of cobalt and chromium is not limited to only 0.95/1 but may be within the scope between about 0.50/1 and 0.999/1. If the molar ratio of lanthanum to the sum of cobalt and chromium is larger than about 0.999/1, non-reacted $La_2O_3$ in the sintered ceramic reacts with water in the air to cause breakage and prevent use as the intended device. If, however, the molar ratio is smaller than about 0.50/1, the sintered ceramic has a small constant B although having an enlarged specific resistance. If so, its constant B is smaller than the constant B of conventional semiconductive ceramic devices, and the device comprising the sintered ceramic thus having such a small constant B is not suitable for the use to which the present invention is directed.

If desired, lanthanum in the LaCo oxides for use in the present invention, such as those mentioned hereinabove, may be partly or wholly substituted with any other rare earth elements and bismuth to give, for example, $La_{0.9}Nd_{0.1}CoO_3$, $La_{0.9}Pr_{0.1}CoO_3$, $La_{0.9}Sm_{0.1}CoO_3$ or $Nd_{0.95}CoO_3$.

In the above-mentioned examples, produced were semiconductive ceramic discs. However, the semiconductive ceramic device of the present invention is not limited to only the shape of such discs but may be in any other form of laminated devices, cylindrical devices, square chips, etc. In the above-mentioned examples, a silver palladium alloy or platinum was used to form the outer electrodes on the semiconductive ceramic devices. However, such is not limitative, but any other electrode materials of, for example, silver, palladium, nickel, copper, chromium or their alloys may also be employed to obtain similar characteristics.

As has been described in detail hereinabove, there is provided according to the present invention, a semiconductive ceramic composition comprising a lanthanum cobalt oxide with a chromium oxide added thereto in an amount of from about 0.005 to 30 mol % in terms of chromium. The composition can have a small specific resistivity at steady state, while having a high constant B of higher than 3000K at high temperatures. In particular, a composition having a chromium content of from about 0.1 to 10 mol % may have a much higher constant B, of higher than 4000K, at high temperatures.

Since the semiconductive ceramic composition of the present invention comprises a rare earth-transition metal oxide, especially a lanthanum cobalt oxide, it is characterized in that it has a small specific resistance at room temperature while having a higher constant B at high temperatures than at low temperatures.

Since the semiconductive ceramic composition of the present invention comprises, as the essential component, a lanthanum cobalt oxide and contains, as the side component, a chromium oxide in an amount of from about 0.1 to 30 mol % in terms of chromium, it has a small specific resistance at the steady state and has a high constant B of higher than 3000K. In particular, the composition having a chromium content of from about 0.5 to 10 mol % may have a high constant B of higher than 3500K at high temperatures.

Having the above-mentioned characteristics, the semiconductive ceramic composition of the present invention can be used for forming devices to be usable in temperature-compensated crystal oscillators and those usable for rush current inhibition, for motor start-up retardation and for halogen lamp protection.

In addition, since the semiconductive ceramic composition of the present invention comprises a lanthanum cobalt oxide while containing a chromium oxide in an amount of from about 0.005 to 30 mol % in terms of chromium, it has a low specific resistance at steady state while having a high B constant of higher than 2500K at high temperatures. Thus, being different from that of conventional semiconductive ceramic devices, the difference in the resistance of the device comprising the composition of the invention between the electrification thereof at room temperature and that at high temperatures (140° C. or so) is large.

Moreover, since the semiconductive ceramic device of the present invention comprises a rare earth-transition element oxide, especially a lanthanum cobalt oxide, it is characterized in that it has a small constant B at room temperature while having a large constant B at high temperatures. Therefore, the device of the invention consumes a reduced amount of energy at steady state, and therefore can be used in instruments through which large currents run.

In addition, since the semiconductive ceramic device of the present invention comprises, as the essential component, a lanthanum cobalt oxide and contains, as the side component, a chromium oxide in an amount of from about 0.1 to 30 mol % in terms of chromium, it is characterized in that it has a low specific resistance at room temperature while having a high constant B of higher than 3000K.

Having such improved characteristics, the semiconductive ceramic device of the present invention can be used for rush current inhibition, for motor start-up retardation and for halogen lamp protection, and can be used in temperature-compensated crystal oscillators. Temperature-compensated crystal oscillators have been specifically referred to herein, in which the device of the present invention is usable. Apart from these, the device of the present invention is usable in any other temperature-compensating circuits to be employed in other instruments.

While the invention has been described in detail and with reference to specific embodiments thereof, it will be apparent to one skilled in the art that various changes and modifications can be made therein without departing from the spirit and scope thereof.

What is claimed is:

1. A semiconductive ceramic composition comprising a lanthanum cobalt oxide having a negative resistance-temperature characteristic, and containing chromium oxide in an amount of from about 0.005 to 30 mol % in terms of chromium.

2. A semiconductive ceramic composition according to claim 1 in which the molar ratio of the lanthanum to the combined cobalt and chromium is about 0.5 to 0.999/1.

3. A semiconductive ceramic composition according to claim 2 in which the molar ratio of the lanthanum to the combined cobalt and chromium is about 0.9 to 0.99/1.

4. A semiconductive ceramic composition according to claim 1 containing the chromium oxide in an amount of from about 0.01 to 10 mol % in terms of chromium.

5. A semiconductive ceramic composition according to claim 1 containing the chromium oxide in an amount of from about 0.1 to 30 mol % in terms of chromium.

6. A semiconductive ceramic composition according to claim 3 containing the chromium oxide in an amount of from about 0.5 to 10 mol % in terms of chromium.

7. A sintered semiconductive ceramic composition comprising the ceramic composition of claim 1.

8. A sintered semiconductive ceramic composition comprising the ceramic composition of claim 2.

9. A sintered semiconductive ceramic composition comprising the ceramic composition of claim 4.

10. A sintered semiconductive ceramic composition comprising the ceramic composition of claim 5.

11. A sintered semiconductive ceramic composition comprising the ceramic composition of claim 6.

12. In an electronic device comprising a semiconductive ceramic composition having a negative resistance characteristic, the improvement which comprises the ceramic composition being the ceramic composition of claim 7.

13. The device according to claim 12 in the form of a device for rush-current inhibition.

14. The device according to claim 12 in the form of a motor start-up retardation device.

15. The device according to claim 12 in the form of a halogen lamp protection device.

16. In a temperature-compensated crystal oscillator comprising a semiconductive ceramic composition having a negative resistance characteristic, the improvement which comprises the ceramic composition being the sintered ceramic composition of claim 10.

17. The device of claim 12 having an electrode on the surface of said semiconductive ceramic.

18. The device according to claim 17 wherein said chromium oxide is in an amount of from about 0.1 to 10 mol % in terms of chromium and the molar ratio of the lanthanum to the combined cobalt and chromium is about 0.5 to 0.999/1.

19. The device according to claim 17 wherein said chromium oxide is in an amount of from 0.1 to 30 mol % in terms of chromium and the molar ratio of the lanthanum to the combined cobalt and chromium is about 0.5 to 0.999/1.

20. The device according to claim 19 wherein said chromium oxide is in an amount of from about 0.5 to 10 mol % in terms of chromium.

* * * * *